United States Patent [19]

Kassai

[11] Patent Number: 4,569,096

[45] Date of Patent: Feb. 11, 1986

[54] SWEEPER WITH HYDRAULICALLY DRIVEN COMPONENTS

[75] Inventor: Denes P. Kassai, Chino, Calif.

[73] Assignee: FMC Corporation, Chicago, Ill.

[21] Appl. No.: 681,058

[22] Filed: Dec. 13, 1984

Related U.S. Application Data

[62] Division of Ser. No. 431,947, Sep. 30, 1982, abandoned.

[51] Int. Cl.$^4$ .............................................. E01H 1/04
[52] U.S. Cl. ...................................... 15/83; 298/22 C
[58] Field of Search ................... 15/82, 83, 84, 85, 86, 15/340; 91/420, 517; 298/11, 22 C

[56] References Cited

U.S. PATENT DOCUMENTS

| | | | |
|---|---|---|---|
| 2,829,391 | 4/1958 | Swanson | 15/83 |
| 3,242,521 | 3/1966 | Young | 15/340 |
| 3,310,825 | 3/1967 | Tamny | 15/82 |
| 3,316,578 | 5/1967 | Tamny | 15/87 |
| 3,381,939 | 5/1968 | Brown et al. | 254/172 |
| 3,636,580 | 1/1972 | Woodworth | 15/84 |
| 3,761,988 | 10/1973 | Overton | 15/83 |
| 3,922,954 | 12/1975 | Gustafsson | 91/517 |
| 4,043,286 | 8/1977 | Doty | 15/DIG. 2 |
| 4,138,756 | 2/1979 | Krier et al. | 15/83 |
| 4,178,647 | 12/1979 | Wolynec et al. | 15/84 |
| 4,211,079 | 7/1980 | Saele et al. | 60/433 |
| 4,328,603 | 5/1982 | Dickson | 15/84 |
| 4,349,305 | 9/1982 | Wynn et al. | 91/517 |
| 4,382,360 | 5/1983 | Dummer | 60/444 |
| 4,395,878 | 8/1983 | Morita et al. | 60/427 |
| 4,400,939 | 8/1983 | Moranduzzo et al. | 60/431 |
| 4,434,616 | 3/1984 | Christopher et al. | 60/451 |

FOREIGN PATENT DOCUMENTS

| | | | |
|---|---|---|---|
| 69331 | 6/1978 | Japan | 60/444 |
| 830452 | 3/1960 | United Kingdom | |
| 976375 | 11/1964 | United Kingdom | |

*Primary Examiner*—Robert W. Jenkins
*Attorney, Agent, or Firm*—A. J. Moore; H. M. Stanley; R. B. Megley

[57] ABSTRACT

A hydraulic system for the components of a street sweeper or the like is disclosed which includes a hydraulic pump and tank connected in series with the motor of an elevator, the motor of a pick-up broom, the motor of a right gutter broom, and the motor of a left gutter broom with each broom motor being driven in response to closing a by-pass valve. The system also includes a control circuit for raising and lowering the several vertically movable components and hydraulics locking them in selected positions. The hydraulic system further includes a hydrostatic drive system including a two-speed shift control assembly.

2 Claims, 8 Drawing Figures

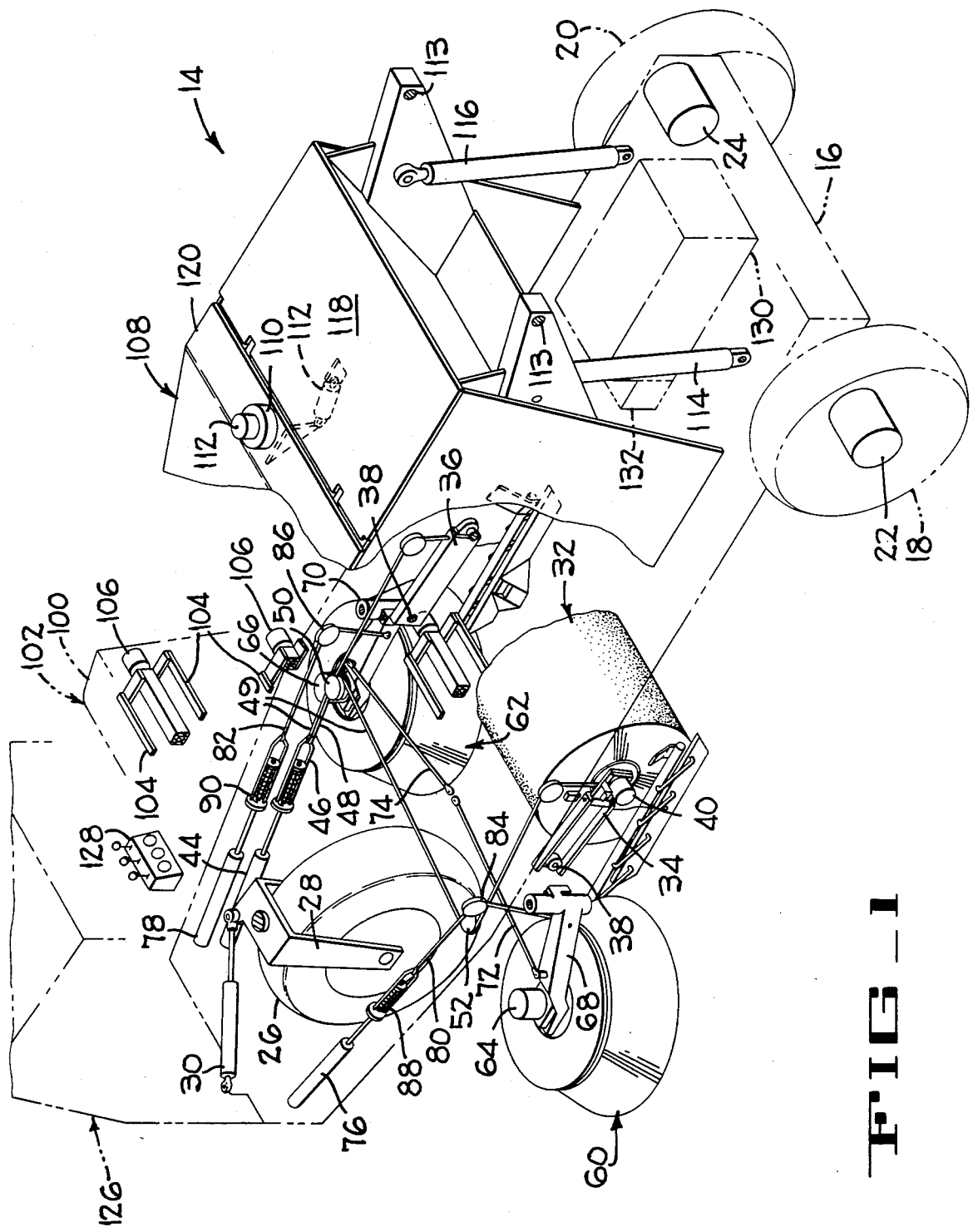
FIG_1

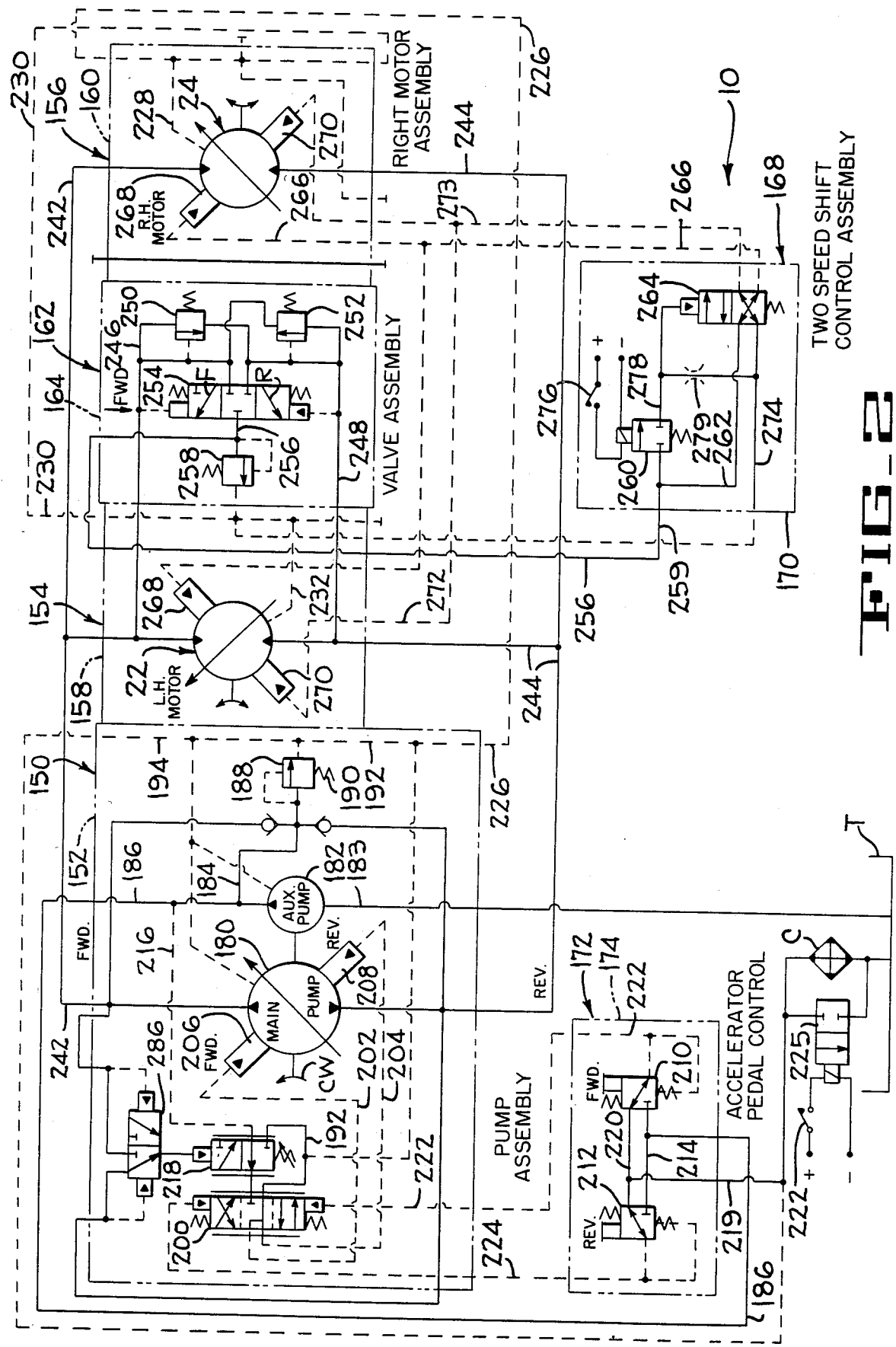
FIG_2

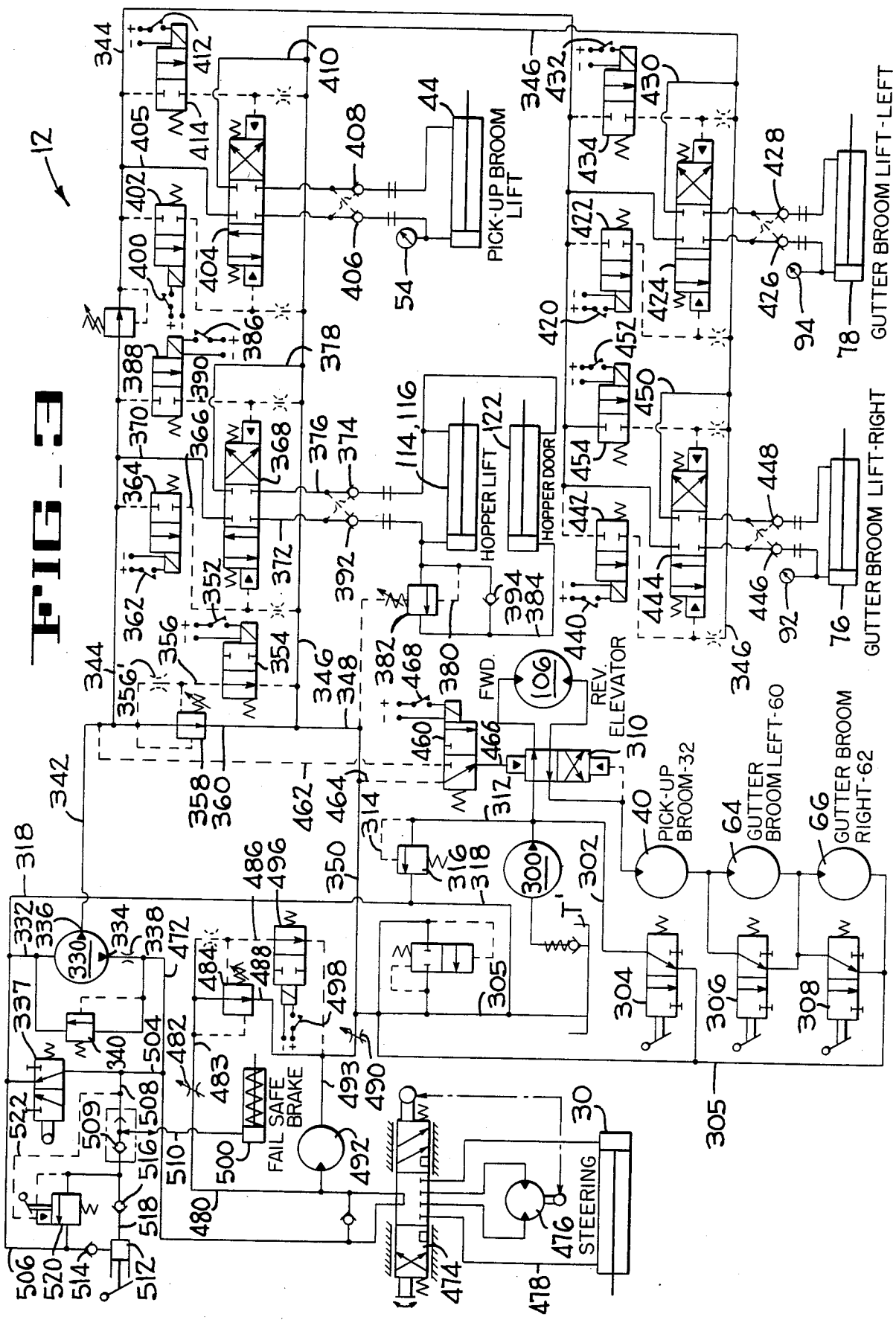

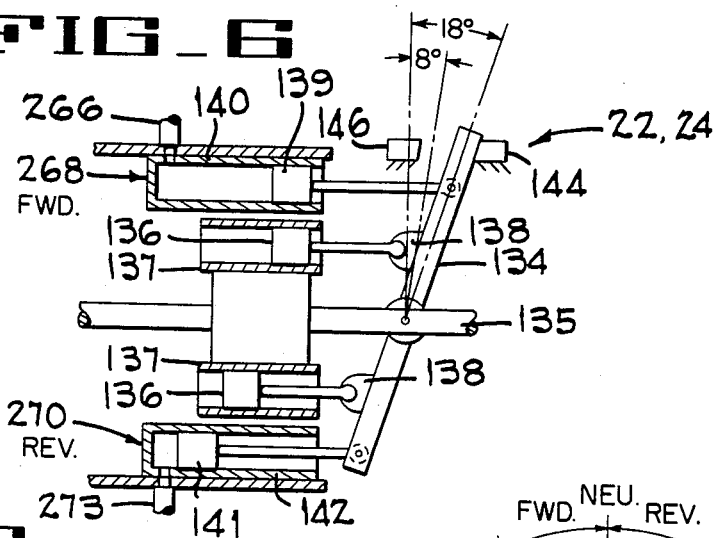
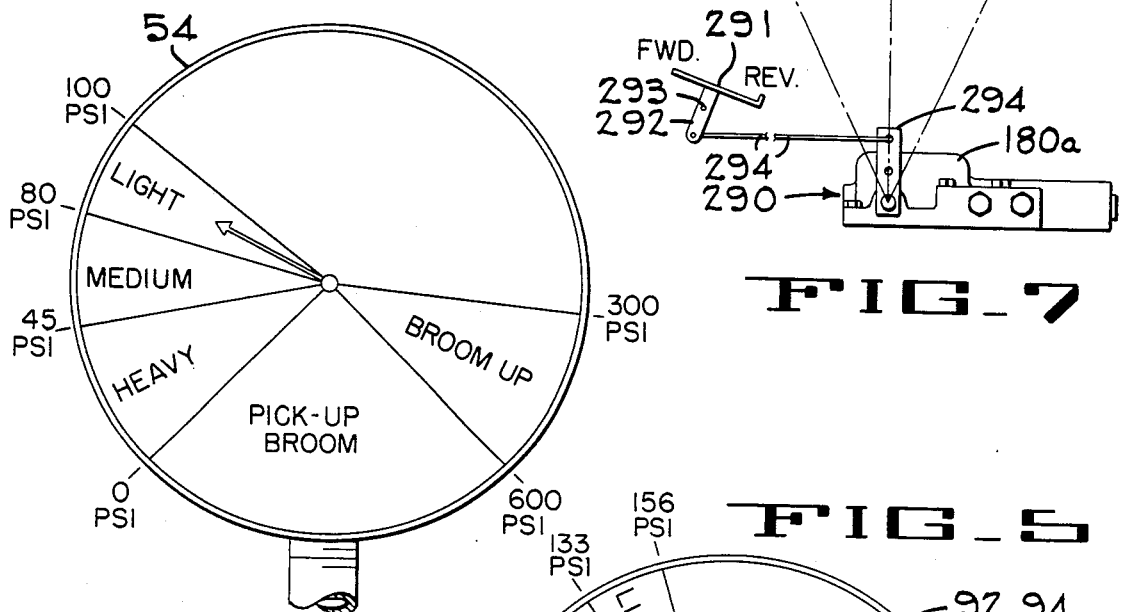
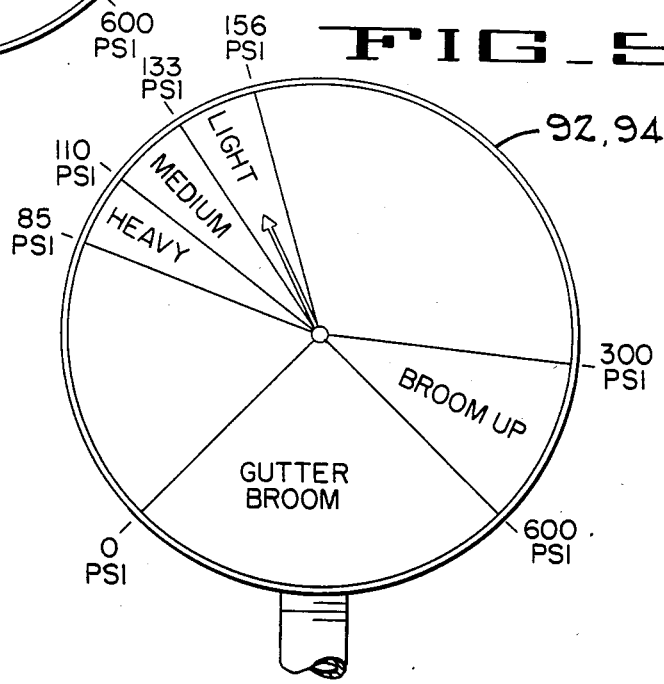

SWEEPER WITH HYDRAULICALLY DRIVEN COMPONENTS

This application is a division of application 431,947 filed 9-30-82 now abandoned.

CROSS REFERENCE TO RELATED APPLICATIONS

The present invention is related to the inventions disclosed in the following applications, all filed on even date herewith and presently assigned to the assignee of the present invention:

Erdman et al application Ser. No. 431,948, entitled now U.S. Pat. No. 4,457,044 which issued on July 3, 1984. Multiple Flight Elevator System.

Rosseau application Ser. No. 431,959 entitled Debris Collection System For Street Sweepers.

Gunnarsson application Ser. No. 431,949, now abandoned, entitled Hopper Support and Dump Mechanism.

The disclosures of the above identified applications are incorporated by reference herein.

BACKGROUND OF THE INVENTION

1. Field of the Invention

The present invention relates to street sweepers or the like and more particularly relates to such sweepers with hydraulically driven and controlled components and a hydraulic vehicle propulsion system.

2. Description of the Prior Art

Street sweepers with mechanical drives to the vehicle propulsion wheels and to the sweeper components are well known in the art as evidenced by U.S. Pat. No. 3,310,825 which issued to Tamny on Mar, 28, 1967.

Street sweepers with mechanical drives to the propulsion wheels and hydraulic drives to certain sweeper components are illustrated in U.S. Pat. No. 3,316,578 to Tamny dated May 2, 1967; and Woodworth U.S. Pat. No. 3,636,580 which issued on Jan. 25, 1982.

SUMMARY OF THE INVENTION

The present invention relates to hydraulic drives for components of a street sweeper or the like including an auxiliary pump which drives an elevator motor, a pick-up broom motor, a left gutter broom motor and a right gutter broom motor all connected in series and with each broom motor being driven in response to closure of separate motor by-pass valves. A control pump is provided to hydraulically power the plurality of hydraulic sweeper components between two positions under the control of a system of pilot operated valves and manual valves. The control system also includes means for hydraulically locking the cylinders in selected positions upon discontinuing flow of fluid thereto. The present invention also covers a hydrostatic traction drive system with a two speed shift control and with remote pilot controls.

BRIEF DESCRIPTION OF THE DRAWINGS

FIG. 1 is a diagrammatic perspective with parts in phantom and other parts broken away illustrating a mobile street sweeper which incorporates the hydraulic components of the present invention.

FIG. 2 is a hydraulic diagram of the pilot controlled hydraulic traction drive system of the mobile street sweeper of FIG. 1.

FIG. 3 is a hydraulic diagram of the hydraulic controls and auxiliary drive of the street sweeper of FIG. 1.

FIG. 4 illustrates a pick-up broom pressure gauge located in the vehicle cab for indicating the pick-up broom sweeping pressure.

FIG. 5 illustrates one of the gutter broom pressure gauges located in the cab for indicating the gutter broom sweeping pressure.

FIG. 6 is a diagrammatic illustration of one of the swash plate propulsion drive motors.

FIG. 7 is a diagrammatic illustration of an alternate mechanical, swash plate control system.

FIG. 7A is an hydraulic diagram of the mechanically operated valve and its connections into the circuit of FIG. 2.

DESCRIPTION OF THE PREFERRED EMBODIMENT

The remote controlled hydrostatic traction drive system 10 (FIG. 2) and the hydraulic control and auxiliary drive system 12 (FIG. 3) are designed to control and operate the several components of the street sweeper illustrated in FIG. 1.

The street sweeper 14 includes a chassis 16 supported on a pair of rear wheels 18,20 driven by hydraulic motors 22,24, respectively. A single steerable front wheel 26 is journaled on a yoke 28 which pivotally supports the front of the chassis 16 and is steered by a hydraulic cylinder 30 connected between the chassis 16 and the yoke 28.

A debris pick-up broom 32 is rotatably mounted on a pair of pivot arms 34,36 having their upper ends pivotally supported by the chassis 16 for movement about a horizontal pivot axis 38. The pick-up broom 32 is driven by a hydraulic motor 40 and is moved between an elevated transport position and a lowered sweeping position by a hydraulic cylinder 44. The hydraulic cylinder 44 has one end anchored to the chassis 16 and has its other end connected to one end of a resilient connector 46. Cables 48,49 are attached to the other end of the associated resilient connector 46 and to the free end of the associated pivot arms 34 or 36 respectively after being trained around cable direction controlling sheaves 50 and 52 journaled to the chassis 16 as clearly illustrated in FIG. 1. As will be described hereinafter, a pressure gauge 54 (FIG. 4) communicates with the pick-up broom cylinder 44 for equalizing the pressure in each cylinder to assure that the pick-up broom will wear evenly, i.e., does not wear into a frusto-conical shape. Also, the pressure gauge 54 is calibrated to provide different surface engaging pressures depending upon the amount of sweeping force required to clean the road or other surface being swept The sweeper 14 also includes left and right gutter brooms 60,62 driven by hydraulic motors 64,66 mounted on support arms 68,70 which are in turn mounted on the chassis 16 for generally vertical movement and generally horizontal pivotal movement by means not fully shown. Cables 72 and 74 are connected between the chassis 16 and the associated arms 68,70 to control the transverse movement of the gutter brooms 60,62. The gutter brooms 60,62 are each moved between a raised transport position and a lowered road engaging gutter sweeping position by hydraulic cylinders 76,78. One end of each hydraulic cylinder 76,78 is connected to the chassis 16, and the other end is connected to the associated support arms 68,70 by cables 80,82 trained over sheaves 84,86 and conventional resilient connectors 88,90. Pressure gauges 92,94 (FIGS. 3 and 5) are connected to the hydraulic cylinders 76,78, respectively, and are observed by an operator for indicating the sweeping pressure applied by the associated gutter broom against the road being cleaned. When the gutter brooms 60,62 are raised to the transport positions, the cables 72,74 pull the brooms inwardly toward the centerline of the chassis.

The debris accumulated by the pick-up broom 32 and the gutter brooms 60,62 is swept into the housing 100 of an elevator 102. The elevator includes a plurality of paddle wheels 104 (three being illustrated in FIG. 1) each independently driven by a hydraulic motor 106 for progressively elevating the debris and discharging it into a hopper 108. A low volume air blower 110 driven by a hydraulic motor 112 is mounted on the hopper for creating an updraft of air through the elevator 102 thereby aiding the movement of leaves or the like into the hopper 108.

The hopper 108 is supported by the chassis 16 for pivotal movement about an axis 113 between the illustrated debris receiving position and a debris dumping position. A pair of hydraulic cylinders 114,116 are pivotally connected between the chassis 16 and the hopper 108 to pivot the hopper between the two positions. The hopper 108 includes a gate 118 which is pivoted to the hopper body 120. A gate opening hydraulic cylinder 122 is connected between the body 120 and the gate 118 for pivoting the gate between an open position and the illustrated closed position.

An operator's cab 126 (shown in phantom lines in FIG. 1) is mounted on the front of the chassis 16 and includes the several hydraulic controls, generally designated 128, as well as the usual sweeper controls (not shown) for operating the vehicle. The sweeper also includes an engine 130 which drives several hydraulic pumps at 132 and which are mounted on the chassis 16 near the rear end thereof.

Prior to describing the remote control hydrostatic drive system 10, it is felt that a brief description of the construction of the prior art hydrostatic motors 22 and 24 would be helpful in understanding the invention.

FIG. 6 diagrammatically illustrates motor 22 which is identical to the motor 24 and includes a non-rotatable swash plate 134 journaled on a rotatable motor shaft 135 and illustrated in its starting position. Main pistons 136 and cylinders 137 are secured to and rotate with the shaft 135 in response to receiving high pressure fluid in one cylinder and discharging the fluid from the other cylinder. The pistons include feet 138 which slide against the non-rotatable swash plate thus imparting rotation to the shaft and the main piston and cylinder units slidably connected thereto. A "forward" non-rotatable control piston 139 and cylinder 140, and a "reverse" control piston 141 and cylinder 142 are provided for controlling the angle of the swash plate 134 and thus the speed of the motors. The pistons 139,141 are connected to the swash plate 134. Stationary abutments 144 and 146 limit the pivotal movement of the swash plate between a maximum displacement, low speed 18° position and a minimum displacement high speed 8° position.

If a more complete description of the several sweeper components mentioned above is desired, reference may be had to the appropriate ones of the above cross referenced applications.

Remote Control Hydrostatic Traction Drive

The remote control hydrostatic traction drive system 10 (FIG. 2) comprises a pump assembly 150 which includes the components located within a housing illustrated by phantom lines 152; left and right motor assemblies 154,156 that include the components located within the housings illustrated by phantom lines 158,160, respectively; a valve assembly 162 illustrated between the motor assemblies and outlined within phantom lines 164; a two-speed shift control assembly 168 illustrated within phantom lines 170; an accelerator pedal control assembly 172 illustrated within phantom lines 174; and a conventional sump or tank T.

The pump assembly 150 includes a main positive displacement, swash plate pump 180 and an auxiliary pump 182 both of which are of conventional design and are driven by the vehicle engine 130 (FIG. 1) in a counterclockwise direction identified by the arrow CW (FIG. 2). The auxiliary pump 182 draws hydraulic fluid through conduit 183 from the tank T and circulates the fluid into the main pump 180 to first charge and thereafter maintain the main pump charged. The auxiliary pump 182 also circulates the fluid through a conventional cooler C and provides make-up fluid for the main pump 180.

The left hydraulic wheel motor 22 (FIGS. 1 and 2) and the right hydraulic wheel motor 24 are conventional positive displacement, swash plate motors which receive hydraulic wheel driving fluid from the main pump 180 and receive control fluid from the auxiliary pump. As is well known in the art, when the pump 180 is being started the swash plate will be positioned substantially normal to its axis of rotation and thus the pistons of the pump will be at low displacement and will pump very little, if any, fluid. Conversely, the swash plate of each motor 22,24 will be positioned at the maximum angle relative to its axis of rotation, thus the pistons of the motors 22,24 will be at maximum displacement at start up.

With main pump 180 and auxiliary pump 182 started, hydraulic fluid will be drawn by the auxiliary pump 182 from the tank T through a suction conduit 183 which directs fluid into conduits 184 and 186. When the pressure in conduit 184 exceeds 220 psi, a pilot pressure operated relief valve 188 is opened against the urging of a spring 190 thereby directing fluid into pilot lines 192 and 194. The pressure in line 192 is directed through a remote control pilot operated fourway valve 200 in the pump assembly 150 when in its illustrated neutral position. Fluid at equal pressure is thus directed through pilot lines 202 and 204 to the forward swash plate control unit 206 and to the reverse swash plate control unit 208 of the main hydraulic pump 180 thus maintaining the main pump at or near zero displacement.

When accelerator pedal forward control valve 210 and reverse valve 212, of the accelerated pedal control assembly 172, are in neutral as indicated in FIG. 2, pressure in auxiliary pump line 186 is directed into conduit 214 and is blocked from further flow by the valves 210 and 212. Fluid in pilot line 216 flows through a parallel passage in a pressure override valve 218 but is blocked from further flow by the centered core of remote control valve 200.

Auxiliary pump fluid in line 194 enters conduits 219,220 and flows at equal pressure through valves 210 and 212 through conduit 222 and 224, repectively, thereby applying equal pilot pressure on opposite ends of valve 200 thus maintaining the valve in the illustrated centered position.

It will be noted that fluid in line 194 normally flows through cooler C to tank T. However, a solenoid operated cooler by-pass valve 225 may be opened by an operator actuated electric switch 222 located in the sweeper's cab to by-pass the cooler C for cold starts or the like.

With the accelerator pedal in the illustrated neutral position, pilot pressure from conduit 192 is directed to the motor assemblies 154,156 through pilot line 226. Pilot pressure and make-up fluid from line 226 enters the right propulsion motor 24 through line 228; and enters the left propulsion motor 22 through lines 230 and 232.

When the operator wishes to drive the sweeper in a forward direction, the forward accelerator pedal is depressed to open variable capacity forward valve 210 the desired amount. Fluid from auxiliary pump 182 and line 186 then flows through forward valve 210 into pilot line 222 which shifts the spool of the remote control valve 200 upwardly (FIG. 2) to the parallel passage position. Pilot fluid from line 216 then flows through the parallel passages in valves 218 and 200, and line 202 to the forward swash plate displacement control unit 206 thus pumping propulsion fluid at the desired capacity through a forward conduit 242 into the two hydraulic motors 22 and 24 to drive the motors in a forward direction. Low pressure fluid discharged from the motors 22 and 24 return through "reverse" conduits 244 to the reverse outlet of the variable displacement pump 180.

In order to drive the sweeper in reverse, the operator releases the forward valve 210 and depresses the reverse valve 212. Fluid then flows from the line 186, through reverse valve 212, through line 224 into the top (as illustrated in FIG. 2) of the valve 200 thereby shifting the valve 200 to its cross-passage position. Pilot fluid from line 216 then flows into conduit 204 to the reverse swash plate control unit 208 which then pumps propulsion fluid into the reverse ports of the two motors 22 and 24 through "reverse" conduits 244 thereby driving the vehicle in reverse direction with the return fluid returning to the pump 180 through "forward" conduit 242.

The valve assembly 162 receives hydraulic fluid from forward conduit 242 and reverse conduit 244 which directs fluid into conduits 246 and 248, respectively. Conduits 246 and 248 communicate with 6000 psi spring loaded pressure relief valves 250 and 252, respectively. The conduits 246 and 248 also communicate with opposite ends of a three-position pilot operated shuttle valve 254. When driving the vehicle in a forward direction, high pressure will be present in "forward" conduits 242 and 246, and the conduits 244 and 248 will be at a lower pressure thus shifting the core of shuttle valve 254 downwardly (FIG. 2).

The components in the valve assembly 162 cooperate with the components in the two-speed shift control assembly 168 in order to control the displacement of the pistons 136 (FIG. 6) in the motors 22,24 and thus the output speed of the motors.

When the motors 22,24 are being driven forward in response to opening accelerator pedal valve 210, the shuttle valve 254 is piloted down (FIG. 2) with its cross passage F communicating with low pressure line 248 and with a line 256 connected to a 165 psi relief valve 258. When the pressure in line 256 is less than 165 psi, valve 258 remains closed and prevents flow of fluid through motor cylinders 140 (FIG. 6).

When relief valve 258 is opened by a pressure in excess of 165 psi, relatively low pressure control fluid flows through passage F of shuttle valve 254 and through conduit 256 to the shift control assembly 168. This fluid then flows through conduit 259 and is blocked by closed solenoid valve 260. This fluid further flows through conduit 262, a cross-passage in pilot operated valve 264, through conduit 266 and into cylinder 140 (FIG. 6) of forward swash plate control unit 268 of each motor 22,24 thus urging the swash plate 134 toward the low speed 18° position. Some fluid drains out of cylinder 142 of reverse swash plate control units 270 of each motor for return to the two-speed shift assembly 168 through conduits 272 and 273. This return fluid then flows through a cross-passage in valve 264, and returns to the reverse control unit 208 of the pump 180 through conduits 274,230,226,192 a parallel passage in valve 200. Some of this relatively low pressure fluid flow from conduit 192. and conduit 194 to the tank T through previously described circuits. It will be noted that excess fluid in line 256 will pass through the open relief valve 258 and flow into line 230 for return to the tank T as above described. The hydraulic motors 22,24 will drive the sweeper at a low speed range of about 0–10 miles per hour when receiving fluid through the last describec control circuits.

The solenoid valve 260 of the two-speed shift assembly 168 is opened in response to the operator closing a switch 276 in the cab when a speed range of between about 0–20 hour in the forward direction is desired. Relatively high pressure fluid flows from conduits 256 and 259, through open solenoid valve 260, and through conduit 278 which pilots valve 264 to its parallel passage position. Some of the high pressure fluid then flows through a restricter 279 into return line 274, while the bulk of the fluid flows from conduit 262 through a parallel passage in valve 264, through previously described conduits to control cylinder 142 (FIG. 6) in each swash plate control unit 270 of motors 22,24 thus urging the swash plate 134 towards its high speed 8° position. Some fluid returns from the cylinder 140 of the forward swash plate control units 268 of each motor 22,24, and flows through previously described conduits and the other parallel passage in valve 264 for return to conduit 274 and the tank T through previously described low pressure control circuits.

It will be understood that springs are provided in each motor for urging the swash plate toward their low speed, maximum displacement 18° portion relative to a plane perpendicular to the shaft of the motor; and that maximum speed, minimum piston displacement occurs at about 8° from said plane.

When driving the vehicle in reverse, the operator actuates the accelerator pedal control to reverse the direction of flow of fluid into the main pump 180 as previously described thereby directing high pressure fluid through conduit 244 into the reverse conduits 248 of the motor assembly 162 which pilots shuttle valve 254 upwardly causing relatively low pressure control fluid from conduit 246 to flow through passage R in shuttle valve 254 thereby preparing to drive the motors 22,24 in their reverse direction. Since the operations performed by the valve assembly 162 and the two-speed shift control assembly 168 are substantially the same as that described in regard to controlling the forward speed of the sweeper, the description of this portion of the circuit is considered unnecessary.

The circuit 10 (FIG. 2) also includes high pressure protection components which protect the hydraulic components from damage. Assuming that the accelerator is actuated to open the "forward" valve 210, and that hydraulic pressure in conduits 242 and 246 exceed 6000 psi, relief valve 250 will first open thereby directing 6000 psi fluid through valve 250 into "reverse" conduit 248, thus balancing the pressure on opposite sides of the two motors 22,24 and returning the shuttle valve to its illustrated central position thereby stopping the flow of control fluid through the motors. The 6000 psi pressure in conduit 242 will also be directed into a pilot operated 6000 psi override control valve 286 to shift override valve 286 to the left (FIG. 2) thereby piloting valve 218 to its cross-passage position. With valve 218 in its cross-passage position, further flow from line 216 through the valve 218 is blocked and conduit 202 communicating with the forward swash plate unit 206 of the main pump 180 is opened through cross passage in valve 218 to reverse line 192 thereby reducing the pressure in line 202 which tends to return the pump 180 to its neutral position. Thus, the pressure is reduced below 6000 psi in the hydraulic system 10 of FIG. 2 allowing the protective components to return to their illustrated positions.

If the vehicle is being driven in a reverse direction the pressure in conduit 248 exceeds 6000 psi, relief valve 252 will first open, rather than or before relief valve 250 opens, thus opening the pressure override control valve 286 thus directing fluid at 6000 psi into forward conduits 246,242 and valve 286 and pilot operated valve 218 to reverse the flow of fluid to the control units 208,206 of the main pump 180 until the maximum pressure drops to a safe pressure below 6000 psi.

FIGS. 7 and 7A diagrammatically illustrate an alternate, mechanical swash plate control system 290 for the main pump 180 which would replace the remote control valves 200 and 218 (FIG. 2) as well as the pedal operated valves 210 and 212 and associated conduits. The single valve 200a (FIG. 7A) would replace the several omitted valves and would be connected to the lines 186,192, 202 and 204 as indicated. The parallel passage position of valve 200a is the "forward" position and the cross passage position is the "reverse" position.

The mechanical swash plate system 290 (FIG. 7) has a pedal 291 in the operator's cab 126 with a forward (FWD) toe portion and a reverse (REV) heel portion. The pedal 291 is secured to a rocker arm 292 that is pivoted to the vehicle about axis 293. A sheathed cable 294 connects the other end of the rocker arm 292 to a swash plate adjusting lever 294 of a conventional positive displacement swash plate pump 180a. The pump may be of a type manufactured by Eaton Corporation, Spencer, Iowa, and only the manual pump control valve thereof is shown. As illustrated, the pump is in its zero displacement position. The operator pivots the pedal 291 with his toe to move the valve 200a to its parallel passage position to drive the pump and vehicle forward, and pivots the pedal with his heel to drive the pump and vehicle in reverse.

It will be apparent that the specific fluid pressures referred to herein, and the pressures to be referred to in regard to the circuit of FIG. 3, are given as approximate pressures to be used with the preferred embodiment of the sweeper of the present invention.

Hydraulic Control And Auxiliary Drive System

The hydraulic control and auxiliary drive system 12 (FIG. 3) includes a fixed displacement auxiliary drive pump 300 driven by the engine 130 (FIG. 1) which receives fluid from a sump or tank T' and returns the fluid to tank T' through one of a plurality of circuits. The fluid may return through conduit 302, a cross passage in a mechanically operated pick-up broom valve 304, a conduit 305 having a heat exchanger therein (not shown) and then to tank T' provided the valve 304 is in its bypass position as illustrated in FIG. 3.

When the pick-up broom 32, the left gutter broom 60 and the right gutter broom 62 are in their raised transport positions; the pick-up broom valve 304, the left gutter broom valve 306 and the right gutter broom valve 308 are all in their illustrated bypass positions. Preferably the valves 304,306 and 308 are mounted in the cab 126 and are manually operated by the operator. However, it is within the scope of the invention to mount these valves in position to be shifted to their parallel passage position in response to lowering the pick-up boom 32, the left gutter broom 60 and the right gutter broom 62, respectively.

In response to shifting the valve 304 to its parallel passage position the flow therethrough is blocked. Fluid from the pump 300 then flows through a parallel passage in pilot operated valve 310 and through said plurality of elevator motors 106 (only one being shown in FIG. 3) to drive the motors 106 in their forward or debris elevating direction. If both of the gutter brooms 60,62 are in their raised transport position, fluid returns to tank T' through the illustrated cross passages in the valves 306,308 and conduit 305. If valve 306 is shifted to the parallel passage position thus blocking flow therethrough, fluid will flow through the motor 64 and thereby driving the left gutter broom in its sweeping direction. Similarly, when the valve 308 closes thereby forcing the fluid through the motor 66 of the right gutter broom 62 the broom 62 will be driven in its sweeping direction. If the discharge pressure of the pump 300 should exceed 4300 psi, pilot pressure from conduits 312 and 314 opens pressure relief valve 316 to discharge fluid to the tank T' through conduits 318 and 305.

A control pump 330 is also driven by the engine 130 (FIG. 1) and draws fluid from the tank T' through the lower portions of conduits 305,318 and 332. The pump 330 is a priority flow pump with two outlets 334 and 336. A manually operated valve 337 must be shifted from the illustrated by-pass position to its closed position to operate pump 330. If pressure from the control pump outlet 334 should exceed 2500 psi after passing through a flow restrictor or orifice 338, a pressure relief valve 340 is opened thereby returning fluid to the inlet conduit of the pump 330.

High pressure fluid flows from pump outlet 336 through conduits 342 and 344 to a plurality of components, while low pressure fluid discharges from the several components and returns to tank T' through conduits 346,348, 350 and 305.

When it is desired to pivot the hopper 108 (FIG. 1), open the hopper door 118, and/or change the elevation of the pick-up broom 32 or gutter brooms 60,62; the operator must first close the switch 352 (FIG. 3) to shift a solenoid valve 354 from the illustrated by-pass position to a position closing pilot line 356 having an orifice 356' therein thereby closing spring loaded, pilot operated pressure relief valve 358 preventing flow of fluid through conduit 360 directly to tank T'.

When it is desired to dump the hopper 108, a switch 362 is closed thereby shifting solenoid valve 364 to its open position allowing high pressure fluid to flow through pilot line 366 having an orifice 366' therein thereby shifting four-way valve 368 to its parallel passage position. High pressure fluid is then directed through conduits 370 and 372 into the closed end of the cylinders 114,116 (only one being shown) thereby extending the pistons and pivoting the hopper into its dumping position. It will be noted that pilot pressure from conduit 372 unseats check valve 374 in conduit 376 to permit fluid to discharge from the rod ends of the cylinders 114,116 and pass through a parallel passage in the valve 368 and through conduit 378 into return conduit 346.

After the cylinders 114,116 have been fully extended, hydraulic pressure increases in line 372 to a pressure in excess of 2000 psi thereby causing pilot pressure in line 380 to open pressure relief valve 382 allowing hydraulic fluid to flow through conduits 384 into hopper door cylinder 122 extending the same and thus opening hopper door 118 (FIG. 1).

When the hopper is empty and the door and hopper are to be returned to their debris receiving positions, switch 362 is opened and a switch 386 is closed thus opening solenoid valve 388 allowing high pressure fluid to flow through a pilot line 390 with an orifice therein thereby piloting valve 368 into its cross-passage position. High pressure fluid then flows from line 370 through a cross-passage in valve 368, through check valve 374 and conduit 376 and into the rod end of cylinder 114,116 and 122. Check valve 392 in line 372 is opened by pilot pressure from conduit 376. The fluid discharged from hopper door cylinder 122 then flows past check valve 394 and combines with fluid discharged from cylinders 114,116 for flow past check valve 392 in conduit 372, and through a cross passage in valve 368 for return to tank T through previously described conduits. When the hopper and door return to their debris receiving positions, the operator opens switch 386 thereby returning valve 368 to its neutral position. It will be apparent that the check valves 374,392 hydraulically lock the cylinders 114,116 and 122 in fixed position after valve 368 returns to its illustrated centered position.

The pick-up broom cylinder 44 is illustrated in retracted position thus holding the broom 32 in its raised transport position. Since the hydraulic components associated with the pick-up broom cylinder 44 are similar to those of the hydraulic hopper components, only the major portions will be described. In order to lower the pick-up broom 32, the operator closes a switch 400 thereby shifting solenoid valve 402 to its parallel passage position which pilots four-way valve 404 into its parallel passage position. Fluid from high pressure conduit 344 flows through conduit 405, through parallel passages in valve 404, past pilot operated check valve 406 to extend the piston in the cylinder 44. Fluid in the rod end of the cylinder 44 flow past pilot opened check valve 408, through a parallel passage in four-way valve 404 and returns to tank T' through conduit 410 and the previously described return conduits.

In order to raise the pick-up broom 32, the switch 400 is opened and a switch 412 is closed thus opening solenoid valve 414 which pilots four-way valve 404 to its cross-passage position. Fluid then flows past check valve 408 into the rod end of cylinder 44 thereby retracting the rod and returning fluid to tank T' through the pilot opened check valve 406, the four-way valve 404, conduit 410 and the previously described return conduits.

A pick-up broom pressure gauge 54 (FIGS. 3 and 4) communicates with the closed end of pick-up broom cylinder 44 and is mounted in the cab for view by the operator thereby enabling the operator to determine the minimum broom pressure against the road being cleaned to provide adequate sweeping and thus minimizing broom wear. As shown in FIG. 4, the pick-up broom pressure gauge 54 is calibrated in accordance with the approximate pick-up broom pressures against the surface as follows: heavy 0–45 psi; medium 45–80 psi; light 80–100 psi. The broom is lifted with pressures between 100–300 psi and varies due to broom wear or the like; and a locking transport position between 300–600 psi.

It will be appreciated that only one gutter will be swept at a time, and accordingly, separate circuits are provided for the left gutter broom 60 and the right gutter broom 62.

In order to lower the left gutter broom 60, switch 420 is closed by the operator thereby opening solenoid valve 422 and piloting four-way valve 424 into its parallel passage position which directs fluid into the closed end of cylinder 78 past check valve 426. Fluid is discharged from the rod end of the cylinder 78 through pilot opened check valve 428, four-way valve 424, and conduit 430 for return to tank T'. The left gutter broom 78 is raised by opening switch 420 and closing switch 432 which opens solenoid valve 434. Fluid flows through valve 434 and pilots four-way valve 424 to its cross passage position thereby directing fluid past check valve 428 to retract the piston rod of cylinder 78. Fluid is then discharged from the closed end of cylinder 78 past pilot opened check valve 426, through a cross passage in four-way valve 424 and to tank T' through conduit 430. A left gutter broom pressure gauge 94 (FIGS. 3 and 5) is located in the operator's cab and is connected to the closed end of the cylinder 78.

Similarly, the right gutter broom 62 is lowered by closing switch 440 which opens solenoid valve 442 thereby piloting four-way valve 444 to its parallel passage position directing fluid past check valve 446 into the closed end of right gutter broom cylinder 76. Fluid in the rod end of cylinder 76 is discharged past check valve 448 through a parallel passage in four way valve 444 and to tank T' through conduit 450. The right gutter broom 62 is raised after the toggle switch 440 is opened and switch 452 is closed thereby opening solenoid valve 454 which pilots four-way valve 444 to its cross passage position. Fluid then flows past check valve 448 into the rod end of cylinder 76 causing fluid in the closed end of cylinder 76 to flow to sump past pilot opened check valve 446, a cross passage in four-way valve 444 and through conduits 450, 346, 348, 350 and 305.

The right gutter broom pressure gauge 92 is located in the operator's cab and is connected to the closed end of the cylinder 76 to indicate the pressure therein. It will be understood that the left gutter broom pressure gauge 94 and the right gutter broom gauge 92 are identically calibrated to indicate the gutter broom pressure against the surface being cleaned. As shown in FIG. 5, the pressure gauges 92,94 have approximate gutter broom sweeping pressure as follows: heavy 85–110 psi; medium 110–133 psi; light 133–156 psi. The gutter broom is lifted to its transport position between approximately 156–300 psi, and the broom is hydraulically locked in transport position at about 600 psi.

As previously described and as illustrated in FIG. 3, the pump 300 directs fluid through parallel passages in pilot operated valve 310 to drive the elevator motors 106 in a forward or debris elevating direction. In order to reverse the direction of the elevator paddle wheel 104 (FIG. 1) and motors 106 (only one being shown in FIG. 3), a solenoid valve 460 is connected by pilot lines 462,464 to the high pressure conduit 342 and low pressure tank return conduit 350 of pump 330. A pilot line 466 connects the solenoid valve 460 to the upper pilot (FIG. 3) of valve 310. The operator closes switch 468 in the operator's cab which energizes solenoid valve 460 to direct high pressure fluid from pilot line 462 thereby shifting four-way pilot valve 310 to its cross passage position. In this way, the direction of a movement of the elevator motors 106 and paddle wheels 104 are reversed to clear debris therefrom.

Although manually operated switch control solenoid valve 460 and pilot operated valve 310 are illustrated for controlling the direction in which the elevator motor is driven, it will be understood that these valves may be replaced by a single manually operated valve similar to valve 310 but mounted in the cab without electrical or pilot inputs.

High pressure fluid from priority flow pump 330 out of port 334 flows through orifice 338 and a restricted conduit 472 to a steering wheel controlled hydraulic steering valve 474 which operates a well known hydraulic assist steering motor 476 and the hydraulic steering cylinder 30 (FIGS. 1 and 3). In order to extend the piston of the cylinder 30 to make a right turn, the core of the valve 474 is shifted to the right (FIG. 3) thereby directing high pressure fluid through power assist motor 476 and into the closed end of the steering cylinder 30 to extend the piston thereof. The fluid in the rod end is discharged through conduit 478, a cross-passage in valve 474, conduit 480, an adjustable flow control valve 482 set at 200 psi, a conduit 483, a normally open adjustable pressure relief valve 484 which closes with the aid of a spring if the pressure in pilot line 486 exceeds 1000 psi. When valve 484 is open, the fluid flows through conduit 488, an adjustable flow control valve 490 set at about 210 psi, and through conduit 305 to tank T'. When turning to the left, the steering wheel is turned to shift the core of steering valve to the left (FIG. 3) thus reversing the direction of fluid flow through the power assist motor 476 and cylinder 30.

A hydraulic water spray motor 492, for dust control or the like, is connected in conduit 493 between conduits 480 and 488, both of which are normally at substantially balanced pressure of about 200 psi. A solenoid operated valve 496 is energized by closing a switch 498 in the cab which blocks conduit 486 and pilots pressure control valve 484 to its closed position thus causing the fluid from line 480 to drive pump 492 and to return to tank T' through conduit 493, flow control valve 490, and conduit 305.

A spring set hydraulically released fail safe brake operated by cylinder 500 is illustrated in locked position. In order to release the brake, the manually operated valve 337 is shifted from the illustrated bypass position by the operator at which time high pressure fluid from pump 330 flows through conduit 472, through a conduit 504, and into the closed end of the brake cylinder 500 through conduit 508, one port of a double port, single ball check valve 509 and through conduit 510 thereby releasing the brake.

In the event the several power driven pumps become inoperative because of engine failure or the like, the spring set brake 500 will lock the sweeper from movement. When it is desired to release the brake 500 so that the sweeper can be towed or the like, the operator manually operates an emergency hand pump 512. The hand pump receives fluid from line 506 which flows into the pump 512 past check valve 514 during the suction stroke. During the compression stroke, fluid is blocked by check valve 514 and is moved past check valve 516 in conduit 518, through another port of the double port check valve 509 and then flows through conduit 510 into brake cylinder 500 thereby compressing the cylinder and releasing the brake. The brake will then be hydraulically locked in its released position by check valve 516, the ball of check valve 509 seated against the right port (FIG. 3), and a pilot or manually operated control valve 520. If the hydraulic problem is corrected and the pump 330 is placed in operation, the fluid in the brake may be released by closing the valve 337 and directing pilot pressure through line 522 thereby opening control valve 520 releasing the fluid into conduit 506. If the problem to the powered hydraulic system has not been solved, then the control valve 520 may be manually opened thus releasing fluid to line 506.

From the foregoing description it is apparent that the hydraulic system of the present invention provides an easily handled control system for changing the elevation of the hopper and its gate, and each of the three brooms; and that these components will be hydraulically locked in their adjusted positions in response to the closing of the associated manually operated valves.

The hydraulic system also includes an auxiliary pump and a hydraulic system for driving the elevator motor in either direction, and the pick-up broom, the left gutter broom, and the right gutter broom in response to lowering the associated brooms and closing the associated by-pass valves. A remote controlled hydrostatic drive is also enclosed which features a two-speed shift control.

In the event a customer should prefer valves which are operated directly by an operator, as opposed to valves which are shifted by the closing of an electrical switch by the operator, it will be understood that cab mounted manually operated non-electrical valves may be used in place of the solenoid valves 354; 364,388 and their pilot operated valve 390; 402,414 and their pilot operated valve 404; 422,432 and their pilot operated valve 424; and 442,454 and their pilot operated valve 444.

Although the best mode contemplated for carrying out the present invention has been herein shown and described, it will be apparent that modification and variation may be made without departing from what is regarded to be the subject matter of the invention.

What is claimed is:

1. A mobile sweeper having a chassis supporting debris hopper means having a hopper body defined by walls including a top wall having a pivotal door means therein and a rear wall; said hopper means supported for pivotal movement about a horizontal axis disposed at a fixed distance above the chassis and near the rear end of the sweeper for movement between a debris retaining position with the door means closed in its debris retaining position, and a debris dumping position with the door means open and with the rear wall of the hopper angled downwardly and rearwardly, said hopper means and said door means each defining sequentially actuated debris control means; the combination comprising:
a power driven control pump;

a hydraulic fluid tank in flow communication with said pump for providing fluid to said pump and said components;

means defining at least one first hydraulic cylinder connected between said chassis and said hopper means for pivoting said hopper means between the debris retaining position and the debris releasing position;

means defining a second hydraulic cylinder for pivoting said door means between its normally closed debris retaining position and an open debris releasing position;

conduit means interconnecting said first and second hydraulic cylinders to said pump;

valving means in said conduit means for receiving fluid from said pump for first diverting fluid into one of said hydraulic cylinder means for pivoting the associated debris control means between its debris retaining position and a debris releasing position, in response to said at least one hydraulic cylinder means reaching the debris releasing position said valving means immediately diverting fluid into the other of said hydraulic cylinders for pivoting the other debris controlling means between its debris retaining position and its debris releasing position for releasing the debris from the hopper means;

said valving means including a directional valve movable between a neutral fluid blocking position and a position permitting fluid to flow therepast, said directional valve being connected to first and second branches of said conduit means between said pump and said at least one hydraulic cylinder; and a pilot operated check valve in each of said first and second branches and operated by pilot pressure in the opposite one of said first and second branches for hydraulically locking said first and second hydraulic cylinders in position when said directional valve is in said neutral position.

2. An apparatus according to claim 1 wherein said hopper is said one debris controlling means and said door is said other debris controlling means.

* * * * *